UNITED STATES PATENT OFFICE.

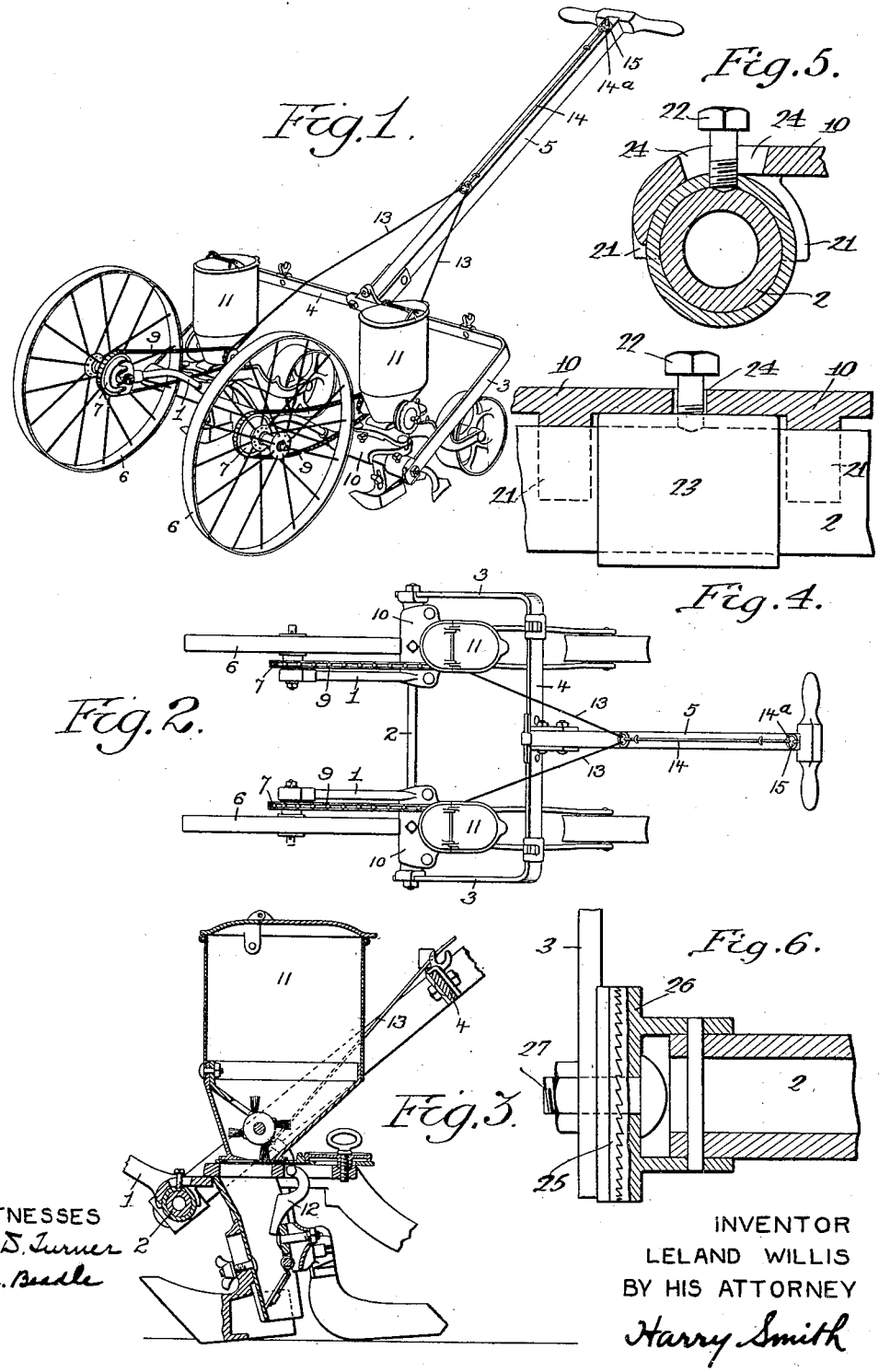

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

DUPLEX SEEDING DEVICE.

1,049,960. Specification of Letters Patent. Patented Jan. 7, 1913.

Application filed March 14, 1911. Serial No. 614,487.

*To all whom it may concern:*

Be it known that I, LELAND WILLIS, a citizen of the United States, residing in Grenloch, New Jersey, have invented certain Improvements in Duplex Seeding Devices, of which the following is a specification.

My invention relates to a duplex seeding device whereby seeds may be simultaneously planted in two rows, the objects of my invention being to so construct such a device that the same will be light enough to be readily operated by hand, will permit ready adjustment of the seeding devices from and toward each other to accord with different widths of rows, and will permit either seeding device to rise and fall to a limited extent independently of that member of the frame upon which it is mounted, so as to compensate for inequalities in the surface of the ground over which the machine is traveling.

In the accompanying drawing Figure 1 is a perspective view of a duplex seed planter constructed in accordance with my invention; Fig. 2 is a plan view of the same; Fig. 3 is an enlarged longitudinal sectional view illustrating one of the features of the invention, and Figs. 4, 5 and 6 are views on a still larger scale illustrating other features of the invention.

The machine has a wheeled frame comprising opposite side members 1 and a transverse rear member 2, and a handle frame comprising opposite side members 3 and a transverse rear member 4, the latter having centrally mounted upon it a handle 5 and the side members 3 being connected at their forward ends to the opposite ends of the transverse member 2 of the wheeled frame. The side members 1 of the latter carry at their forward ends the axles for the supporting wheels 6 of the machine, the hub of each of these wheels having secured to or forming part thereof a sprocket wheel 7 which, by means of a chain 9, drives the seed delivery mechanism of its respective seeding machine, each of the latter being mounted, by means of a bracket 10 upon the transverse member 2 of the frame, so that it is laterally adjustable thereon to suit the desired width of rows, each of these brackets also carrying its respective side member 1 of the frame.

The seeding device may be constructed in any desired manner, the particular construction of such device forming no part of my present invention. I employ in connection with each of the seed hoppers 11 and swinging valve 12 pivotally mounted upon the frame of the seeding machine and adapted, when in one position, to close the mouth of the seed hopper and prevent delivery of seeds therefrom so as to arrest the seeding operation when the machine is being turned at the end of a row.

Each of the valves 12 is connected to a wire 13, the wires of both valves running to an eye on a rod 14 which is adapted to suitable guides on the handle 5 and is provided at its outer end with a ring 14ª which may be caused to engage a pin 15 on the handle when it is desired to close the valves, the latter opening automatically when the ring has been freed from engagement with the pin.

By reason of the open wheeled frame the weight of the machine is reduced, so that it can be readily operated by hand while at the same time the rear member of the frame provides a convenient means for permitting the ready adjustment of the seeding devices from and toward each other to suit the different widths of rows, the means for stopping the delivery of seeds while turning the machine at the end of the row, being under convenient control of the operator so that no time is lost in effecting this operation at the end of the row.

The bracket 10, upon which each of the seeding devices is mounted, has depending ears 21 straddling the rear member 2 of the wheeled frame, so that the bracket can rock on said member 2 in order to permit the seeding device to rise and fall to a limited extent to accord with inequalities in the surface of the ground over which the machine is traveling, the extent of such rise and fall being limited by means of a set screw, pin, or other projection 22 carried by a collar 23 which is fixedly secured to the member 2, the projection 22 playing in a segmental slot 24 formed in the bracket 10, as shown in Figs. 4 and 5.

The side members 3 of the handle frame are engaged by jaws upon a washer 25 having a serrated inner face which engages the correspondingly serrated outer face of a collar 26 secured to the member 2, the pivot bolt 27 serving to keep all of these parts in proper contact when the machine is in use, but permitting separation of the washer 25 and collar 26 when it is desired to raise or lower the handle in order to adapt the same to the height of the person operating the machine.

By raising the handle 5 the frame member 2 is caused to rock until the pins 22 come into contact with the forward ends of the slots 24 in the brackets 10, whereupon the movement is imparted to said brackets and the seeding devices are lifted so as to clear the ground at the end of a row and permit of the ready turning of the machine.

I claim:

1. A duplex seed planter having a frame with transverse rear member and forwardly projecting side members, supporting wheels mounted upon said forwardly projecting side members, seeding devices mounted upon the transverse rear member, and a handle frame having forwardly projecting side members pivotally connected to the transverse member of the wheeled frame and a handle connected to the transverse member of said handle frame.

2. The combination of the wheeled frame, the seeding devices, segmentally slotted means for mounting the same upon the rear member of said frame so as to permit of a limited amount of rise and fall of said seeding devices independently of the member upon which they are mounted, a handle frame, and means for mounting the same upon the rear member of the wheeled frame so as to permit of adjustment of the handles to different heights without imparting corresponding movement to said wheeled frame.

3. The combination of the wheeled frame, the seeding devices, carrier therefor pivotally mounted upon the rear member of the frame, and a fixed collar on the latter having a projecting member adapted to a segmental slot in the carrier for the seeding device.

In testimony whereof, I have signed my name to this specification, in the presence of two subscribing witnesses.

LELAND WILLIS.

Witnesses:
 HARRY SNYDER,
 WALTER MCWHORTER.

---

Copies of this patent may be obtained for five cents each, by addressing the "Commissioner of Patents, Washington, D. C."